(12) United States Patent
Weisenburger (10) Patent No.: US 9,177,384 B2
(45) Date of Patent: Nov. 3, 2015

(54) SEQUENTIAL ROLLING BUNDLE ADJUSTMENT

(71) Applicant: Shawn D. Weisenburger, Christchurch (NZ)

(72) Inventor: Shawn D. Weisenburger, Christchurch (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 168 days.

(21) Appl. No.: 13/954,995

(22) Filed: Jul. 31, 2013

(65) Prior Publication Data

US 2015/0036888 A1    Feb. 5, 2015

(51) Int. Cl.
*G06K 9/46* (2006.01)
*G06T 7/20* (2006.01)
*G01C 11/06* (2006.01)
*G06T 7/00* (2006.01)

(52) U.S. Cl.
CPC . *G06T 7/20* (2013.01); *G01C 11/06* (2013.01); *G06T 7/0018* (2013.01); *G06T 7/0038* (2013.01); *G06T 7/208* (2013.01); *G06T 2207/10004* (2013.01); *G06T 2207/10016* (2013.01); *G06T 2207/10021* (2013.01); *G06T 2207/20024* (2013.01); *G06T 2207/20076* (2013.01); *G06T 2207/20081* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 6,711,293 B1 | 3/2004 | Lowe | |
| 6,738,424 B1* | 5/2004 | Allmen et al. | 375/240.08 |
| 7,336,814 B2 | 2/2008 | Boca et al. | |
| 2003/0083804 A1 | 5/2003 | Pilley et al. | |
| 2006/0125691 A1 | 6/2006 | Menache et al. | |
| 2006/0256200 A1* | 11/2006 | Matei et al. | 348/208.14 |
| 2007/0253618 A1* | 11/2007 | Kim et al. | 382/154 |
| 2008/0144925 A1* | 6/2008 | Zhu et al. | 382/154 |
| 2008/0285805 A1 | 11/2008 | Luinge et al. | |
| 2009/0093959 A1 | 4/2009 | Scherzinger et al. | |
| 2010/0063733 A1 | 3/2010 | Yunck | |

(Continued)

OTHER PUBLICATIONS

Simon, Gilles, Andrew W. Fitzgibbon, and Andrew Zisserman. "Markerless tracking using planar structures in the scene." Augmented Reality, 2000.(ISAR 2000). Proceedings. IEEE and ACM International Symposium on. IEEE, 2000.*

(Continued)

*Primary Examiner* — Li Liu
(74) *Attorney, Agent, or Firm* — Kilpatrick Townsend & Stockton LLP (57) ABSTRACT

A method for estimating position and orientation of an image-capturing device is proposed. The method comprises the step of obtaining a preceding set of frames by using the image-capturing device. Each frame includes a set of image data. The method of the present technology further comprises the step of estimating a previous position and orientation of the image-capturing device by using the set of image data included in at least one preceding frame, and the step of estimating a current position and orientation of the image-capturing device by replacing a set of image data included in at least one preceding frame by a set of image data included in at least one subsequent frame. At least one subsequent frame is obtained by using the image-capturing device.

24 Claims, 7 Drawing Sheets

(56) References Cited

U.S. PATENT DOCUMENTS

| | | | |
|---|---|---|---|
| 2010/0158352 A1* | 6/2010 | Yu et al. | 382/154 |
| 2010/0232727 A1* | 9/2010 | Engedal | 382/285 |
| 2012/0163656 A1 | 6/2012 | Wang et al. | |
| 2014/0003661 A1* | 1/2014 | Kwon et al. | 382/103 |
| 2014/0010407 A1* | 1/2014 | Sinha et al. | 382/103 |

OTHER PUBLICATIONS

Fitzgibbon, Andrew W., and Andrew Zisserman. "Automatic camera recovery for closed or open image sequences." Computer Vision-ECCV'98. Springer Berlin Heidelberg, 1998. 311-326.*

Lepetit, Vincent, et al. "Fully automated and stable registration for augmented reality applications." Proceedings of the 2nd IEEE/ACM International Symposium on Mixed and Augmented Reality. IEEE Computer Society, 2003.*

International Application No. PCT/US2011041590, International Search Report and Written Opinion of the International Searching Authority, date of mailing Oct. 18, 2011, by ISA/US Authorized officer Lee W. Young.

Davide Scaramuzza et al., "Visual Odometry [Tutorial]", IEEE Robotics & Automation Magazine, vol. 18, No. 4, p. 80-92, Dec. 2011.

Chris Engels et al., "Bundle Adjustment Rules", Photogrammetric Computer Vision, p. 266-271, Sep. 2006.

E. Mouragnon et al., "Real Time Localization and 3D Reconstruction", Conference on Computer Vision and Pattern Recognition, 2006 IEEE Computer Society, p. 363-370, Jan. 2006.

* cited by examiner

SEQUENTIAL ROLLING BUNDLE ADJUSTMENT

TECHNICAL FIELD

The technology relates to photogrammetry, and more specifically to estimation of a camera motion from a set of video frames or image sequences.

BACKGROUND

Photogrammetry is the practice of determining the geometric properties of objects from photographic images. In the simplest example, the distance between two points that lie on a plane parallel to the photographic image plane can be determined by measuring their distance on the image, if the scale s of the image is known. This is done by multiplying the measured distance by 1/s.

A more sophisticated technique, called stereo photogrammetry, involves estimating the three-dimensional coordinates of points on an object. These are determined by measurements made in two or more photographic images taken from different positions (see stereoscopy). Common points are identified on each image. A line of sight (or ray) can be constructed from the camera location to the point on the object. It is the intersection of these rays (triangulation) that determines the three-dimensional location of the point. More sophisticated algorithms can exploit other information about the scene that is known a priori, for example symmetries, in some cases allowing reconstructions of 3-D coordinates from only one camera position.

There are known current shortcomings of the available solutions. Indeed, the optimal solution was to use a bundle adjustment which is computationally expensive due to the fact that all data is required before the solution can be computed. This means a bundle adjustment per se is not appropriate for real-time implementation.

Alternative solutions include the usage of a Kalman filter. However, this approach fails to take advantage of the connection of the current measurements to previously estimated position and orientation states.

A third solution is to use pairs or triplets of images to estimate the relative motion between the frames. This solution suffers from drift due to the loss of information connecting the measurements to images outside the pair/triplet used for the estimation.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

A method of the present technology configured for estimating position and orientation of an image-capturing device is proposed. The method comprises the step of obtaining a preceding set of frames by using the image-capturing device. Each frame includes a set of image data.

The method of the present technology further comprises the step of estimating a previous position and orientation of the image-capturing device by using the set of image data included in at least one preceding frame, and the step of estimating a current position and orientation of the image-capturing device by replacing a set of image data included in at least one preceding frame by a set of image data included in at least one subsequent frame. At least one subsequent frame is obtained by using the image-capturing device.

DESCRIPTION OF THE DRAWINGS

The accompanying drawings, which are incorporated in and form a part of this specification, illustrate embodiments of the technology and, together with the description, serve to explain the principles below.

DETAILED DESCRIPTION

Reference now is made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

The present technology addresses and provides a solution to the following problem: How to efficiently estimate camera motion from a set of video frames or image sequences in a way feasible for real-time implementation.

The main idea is to estimate camera motion by using the previous N frames, whereas each new frame can be sequentially added to the estimation while the oldest frame is removed from the state. The sequential addition of measurements from a new frame is much more efficient than completely re-estimating the last N frames in a bundle adjustment.

Figure 1:
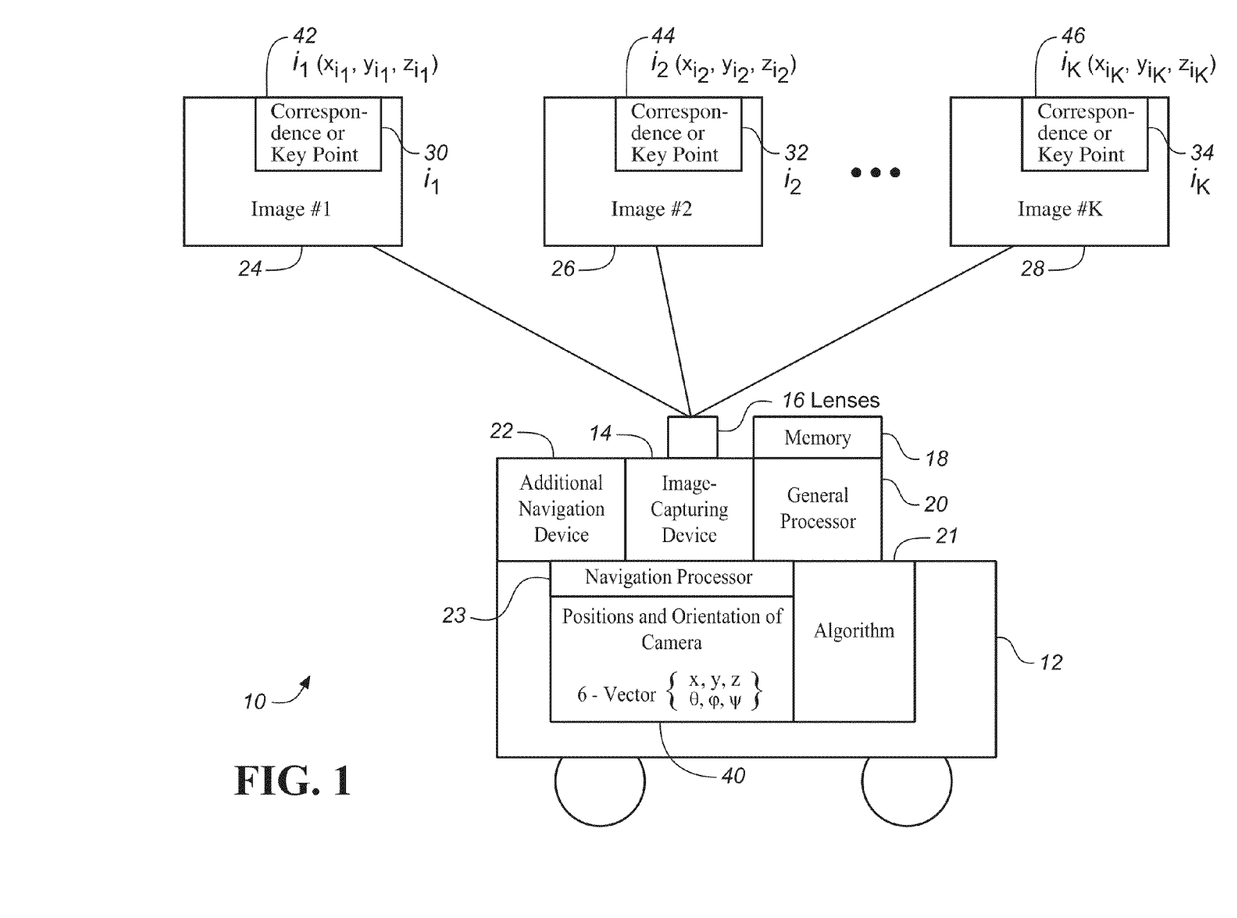
FIG. 1 is the block diagram of an apparatus of the present technology configured to implement a rolling sequential bundle adjustment algorithm in order to obtain the coordinates and orientation of an image-capturing device in real time.

In the embodiment of the present technology, FIG. 1 is the block diagram of an apparatus 10 configured to implement a rolling sequential bundle adjustment algorithm in order to obtain the coordinates and orientation of the image-capturing device 14 in real time.

In the embodiment of the present technology, the image-capturing device 14 is mounted on the mobile platform 12. The mobile platform is selected from the group consisting of: a car, a truck, a bike, a motorbike, a boat, etc.

In an embodiment of the present technology, the image capturing device 14 is configured to perform an image-capture of a scene (not shown) in a software mode (SW) further comprising a memory 18 loaded with an image processing algorithm 21, and a general purpose processor (or a Digital Signal Processor, or a Graphic Processing Unit, etc.) 20 configured to analyze the set of K-images 24, 26, ..., 28 collected in each i-frame by enabling the image processing algorithm 21.

In an embodiment of the present technology, the image capturing device 14 is configured to perform an image-capture of a scene (not shown) in a hardware mode (HW) further comprising an ASIC chip (or FPGA chip) (not shown) (in analog or digital modes) configured to analyze the set of K-images 24, 26, ..., 28 by implementing in hardware the image processing algorithm 21.

In an embodiment of the present technology, the image processing algorithm 21 comprises the rolling sequential bundle adjustment algorithm. Please, see discussion below.

In an embodiment of the present technology, the image capturing device 14 is selected from the group consisting of: a digital camera; a digital video camera; a digital camcorder; a stereo digital camera; a stereo video camera; a motion picture camera; and a television camera.

Figure 3:
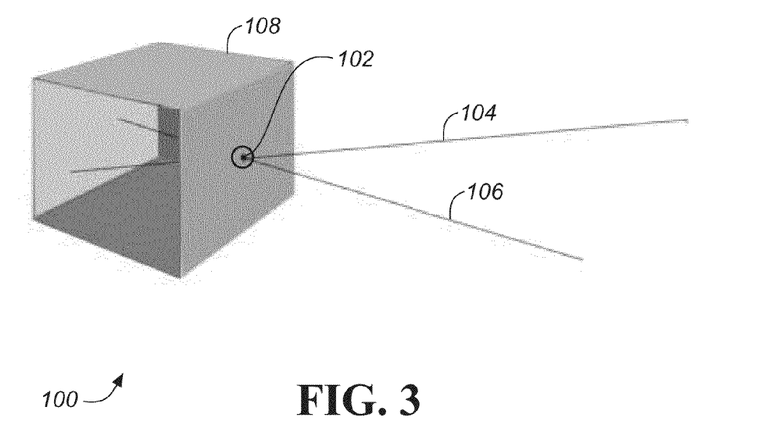
FIG. 3 depicts light beams passing through the pinhole of a pinhole camera for the purposes of the present technology.

In an embodiment of the present technology, as shown in FIG. 3, the image capturing device 14 can be modeled by a pinhole camera 108 that captures light beams 104 and 106 passing through the pinhole 102.

Motion picture or cine cameras record movement at regular intervals in a series of frames. Television and video cameras are configured to record movement electronically for broadcast and storage on magnetic media or optical disks. Camcorders are video cameras which contain both the image sensor and recording media in a single unit.

But for the exclusion of pinhole cameras, which focus the image on the film through a tiny hole, all other cameras use lenses 16 (of FIG. 1) for focusing. The focal length of lenses, i.e., the distance between the rears of the lenses (when focused on infinity) the imaging device, determines the angle of view, or field of view (FOV) (not shown) and the size of objects as they appear as images 24, 26, and ... 28. The image is focused on that surface by adjusting the distance between the lenses and the surface.

In an embodiment of the present technology, referring still to FIG. 1, the lens 16 further comprises regular rectilinear lens. Rectilinear lens is a lens in which straight lines are not substantially curved or distorted.

In an embodiment of the present technology, the lens 16 further comprises a fisheye lens. A fisheye lens is a wide-angle lens that takes in an extremely wide, hemispherical image. Fisheye lenses are often used to shoot broad landscapes. Fisheye lenses achieve extremely wide angles of view by forgoing a rectilinear image, opting instead for a special mapping (for example: equisolid angle), which gives images a characteristic convex appearance.

In geometry, a solid angle (symbol: $\Omega$) is the two-dimensional angle in three-dimensional space that an object subtends at a point. It is a measure of how large the object appears to an observer looking from that point. In the International System of Units (SI), a solid angle is a dimensionless unit of measurement called a steradian (symbol: sr). A small object nearby may subtend the same solid angle as a larger object farther away.

In an embodiment of the present technology, the image capturing device 14 further comprises a display (not shown) further comprising an optical display, a liquid crystal display (LCD), or a screen.

In an embodiment of the present technology, the image capturing device 14 further comprises a stereo digital camera. A stereo camera is a type of camera with two or more lenses. This allows the camera to simulate binocular vision, and therefore gives it the ability to capture three-dimensional images, a process known as stereo photography.

Stereo cameras may be used for making stereo views and 3-D pictures for movies, or for range imaging. 3-D Images Ltd., located in UK, produces a 3-D Digital Stereo camera—a fully automatic, time synchronized, digital stereo camera. Point Grey Research Inc., located in Canada produces binoculars or multiple array cameras that can provide full field of view 3 D measurements in an unstructured environment.

In an embodiment of the present technology, referring still to FIG. 1, the additional navigation device 22 (including the navigation processor 23) is configured to provide the initial position coordinates and orientation of the image-capturing device 14.

In an embodiment of the present technology, the additional navigation device 22 is selected from the group consisting of: a smart phone; a tablet, a laptop, and a personal navigation device.

A personal navigation assistant (PNA) also known as personal navigation device or portable navigation device (PND) is a portable electronic product which combines a positioning capability (such as GPS) and navigation functions The latest generation of PNA have sophisticated navigation functions and feature a variety of user interfaces including maps, turn-by-turn guidance and voice instructions. To reduce total cost of ownership and time to market, most modern PNA devices such as those made by Garmin Ltd., Mio Technology Ltd. or TomTom International BV. are running an off-the-shelf embedded operating system such as Windows CE or Embedded Linux on commodity hardware with OEM versions of popular PDA Navigation software packages such as TomTom Navigator, I-GO 2006, Netropa IntelliNav iGuidance, or Destinator.

Other manufacturers like Garmin and Magellan prefer to bundle their own software developed in-house. Because many of these devices use an embedded OS, many technically inclined users find it easy to modify PNAs to run third party software and use them for things other than navigation, such as a low-cost audio-video player or PDA replacement.

In an embodiment of the present technology, referring still to FIG. 1, the image-capturing device 14 (camera) is calibrated. This calibration is used to correct the images for lens 16 distortions. Typical calibrations correct for principal distance (focal length), principal point offset, radial distortion, tangential distortion, and other effects that can be found in any text book on photogrammetry. All image measurements are corrected with these calibration parameters.

In an embodiment of the present technology, referring still to FIG. 1, the calibrated image-capturing device 14 is configured to collect the K images (24, 26, through 28) in the i-frame; i is an integer In an embodiment of the present technology, referring still to FIG. 1, within each of the K images (24, 26, through 28) key-points are identified. The key-points are the features that are common in multiple frames. For example, in the first frame the key-points are: the key-point $i_1$ 30 in the image #1 24, the key-point $i_2$ in the image #2 26, and key-point $i_K$ 34 in the image #K 28. These key-points should be tracked in the following frames. See discussion below.

In an embodiment of the present technology, referring still to FIG. 1, the obtained image data for the key-points ($i_1$ 30 in the image #1 24; $i_2$ 32 in the image #2 26; ... $i_K$ 34 in the image #K 28) is used within the bundle adjustment algorithm (please, see the discussion below) to estimate the position and orientation of the image-capturing device 14: the '6'-vector 40 including the position coordinates (x, y, z) as well as the orientation angles θ, φ, and ψ. The obtained image data for the key-points ($i_1$ 30 in the image #1 24; $i_2$ 32 in the image #2 26; ... $i_K$ 34 in the image #K 28) is also used within the bundle adjustment algorithm (please, see the discussion below) to obtain the position coordinates of the key-points: position coordinates 42 ($x_{i1}$, $y_{i1}$, $z_{i1}$) of the key-point $i_1$, the position coordinates 44 ($x_{i2}$, $y_{i2}$, $z_{i2}$) of the key-point $i_2$, and the position coordinates 46 ($x_{iK}$, $y_{iK}$, $z_{iK}$) of the key-point $i_K$.

In an embodiment of the present technology, referring still to FIG. 1, the algorithm 21 includes the rolling sequential bundle adjustment algorithm, which is the further development of the full bundle adjustment algorithm.

Given a set of images depicting a number of 3-D points from different viewpoints, the bundle adjustment can be defined as the problem of simultaneously refining the 3-D coordinates describing the scene geometry as well as the parameters of the relative motion and the optical characteristics of the image-capturing device (14 of FIG. 1) employed to acquire these images, according to an optimality criterion involving the corresponding image projections of all points.

The correspondence problem refers to the problem of ascertaining which parts of one image correspond to which parts of another image, where differences are due to movement of the camera, the elapse of time, and/or movement of objects in the photos.

Given two or more images of the same 3-D scene, taken from different points of view, the correspondence problem refers to the task of finding a set of points in one image which can be identified as the same points in another image. To do this, points or features in one image are matched with the corresponding points or features in another image. The images can be taken from a different point of view, at different times, or with objects in the scene in general motion relative to the image-capturing device (for example, a camera).

The correspondence problem can occur in a stereo situation when two images of the same scene are used, or can be generalized to the N-view correspondence problem. In the latter case, the images may come either from N different image-capturing devices (cameras) photographing at the same time or from one image-capturing device (camera) which is moving relative to the scene and collecting the image data from N-frames. The problem is made more difficult when the objects in the scene are in motion relative to the camera(s).

A typical application of the correspondence problem occurs in panorama creation or image stitching—when two or more images which only have a small overlap are to be stitched into a larger composite image. In this case it is necessary to be able to identify a set of corresponding points in a pair of images in order to calculate the transformation of one image to stitch it onto the other image.

There are two basic ways to find the key-points between two images: the correlation-based; and the feature based.

The correlation-based method includes checking if one location in one image looks/seems like another in another image.

The feature-based method includes finding features in an image and seeing if the layout of a subset of features is similar in the two images. To avoid the aperture problem a good feature should have local variations in two directions.

In computer vision applications the correspondence problem is studied for the case when a computer should solve it automatically with only images as input. Once the correspondence problem has been solved, resulting in a set of image points which are in correspondence, other methods can be applied to this set to reconstruct the position, motion and/or rotation of the corresponding 3-D points in the scene.

Example I

To find the correspondence between set A [1,2,3,4,5] and set B [3,4,5,6,7] find where they overlap and how far off one set is from the other. Here we see that the last three numbers in set A correspond with the first three numbers in set B. This shows that B is offset 2 to the left of A.

In most camera configurations, finding correspondences requires a search in two-dimensions. However, if the two cameras are aligned to be coplanar, the search is simplified to one dimension—a horizontal line parallel to the line between the cameras. Furthermore, if the location of a point in the left image is known, it can be searched for in the right image by searching left of this location along the line, and vice versa).

Image rectification is an equivalent, and more often used alternative to perfect camera alignment. Image rectification is usually performed regardless of camera precision because it may be impractical to perfectly align cameras, and even perfectly aligned cameras may become misaligned over time.

If the images to be rectified are taken from camera pairs without geometric distortion, this calculation can easily be made with a transformation including: (i) X & Y rotation that puts the images on the same plane, (ii) scaling that makes the image frames be the same size, and (iii) Z rotation & skew adjustments that make the image pixel rows directly line up. The rigid alignment of the cameras needs to be known (by calibration) and the calibration coefficients are used by the transform.

In performing the transform, if the cameras themselves are calibrated for internal parameters, an essential matrix provides the relationship between the cameras.

The more general case (without camera calibration) is represented by the fundamental matrix. If the fundamental matrix is not known, it is necessary to find preliminary point correspondences between stereo images to facilitate its extraction.

There are basically three algorithms for image rectification: planar rectification, cylindrical rectification, and polar rectification. A simple method is to compare small patches between rectified images. This works best with images taken with roughly the same point of view and either at the same time or with little to no movement of the scene between image captures, such as stereo images.

A small window is passed over a number of positions in one image. Each position is checked to see how well it compares with the same location in the other image. Also several nearby locations are also compared for the objects in one image may not be at exactly the same image-location in the other image. It is possible that there is no fit that is good enough. This may mean that the feature is not present in both images, it has moved farther than your search accounted for; it has changed too much, or is being hidden by other parts of the image.

The notion of Hough transform is important in understanding the bundle adjustment. More specifically, the Hough transform is a feature extraction technique used in image analysis, computer vision, and digital image processing.

The purpose of the Hough transform technique is to find imperfect instances of objects within a certain class of shapes by a voting procedure. This Hough voting procedure is carried out in a parameter space, from which object candidates are obtained as local maxima in a so-called accumulator space that is explicitly constructed by the algorithm for computing the Hough transform.

The classical Hough transform was concerned with the identification of lines in the image, but later the Hough transform has been extended to identifying positions of arbitrary shapes, most commonly circles or ellipses.

There are several examples of a feature-based 3-D reconstruction algorithm.

Scale-invariant feature transform (or SIFT) is an algorithm in computer vision designed to detect and describe local features in images. The algorithm was published by David Lowe in 1999. This algorithm uses the Hough transform. Applications include object recognition, robotic mapping and navigation, image stitching, 3-D modeling, gesture recognition, video tracking, individual identification of wildlife and match moving. The algorithm is patented in the US; the owner is the University of British Columbia. Please, see U.S. Pat. No, 6,711,293, entitled "Method and apparatus for identifying scale invariant features in an image and use of same for locating an object in an image" and issued to David G. Lowe.

According to the scale-invariant feature transform (or SIFT) algorithm, for any object in an image, interesting points on the object can be extracted to provide a "feature description" of the object. This description, extracted from a training image, can then be used to identify the object when attempting to locate the object in a test image containing many other objects. To perform reliable recognition, it is important that the features extracted from the training image be detectable even under changes in image scale, noise and illumination. Such points usually lie on high-contrast regions of the image, such as object edges.

Another important characteristic of these features is that the relative positions between them in the original scene shouldn't change from one image to another. For example, if only the four corners of a door were used as features, they would work regardless of the door's position; but if points in the frame were also used, the recognition would fail if the door is opened or closed. Similarly, features located in articulated or flexible objects would typically not work if any change in their internal geometry happens between two images in the set being processed.

However, in practice SIFT detects and uses a much larger number of features from the images, which reduces the contribution of the errors caused by these local variations in the average error of all feature matching errors.

Lowe's patented method can robustly identify objects even among clutter and under partial occlusion, because his SIFT feature descriptor is invariant to uniform scaling, orientation, and partially invariant to affine distortion and illumination changes. This section summarizes Lowe's object recognition method and mentions a few competing techniques available for object recognition under clutter and partial occlusion.

SIFT key-points of objects are first extracted from a set of reference images and stored in a database. An object is recognized in a new image by individually comparing each feature from the new image to this database and finding candidate matching features based on Euclidean distance of their descriptor vectors. From the full set of matches, subsets of key-points that agree on the object and its location, scale, and orientation in the new image are identified to filter out good matches. The determination of consistent clusters is performed rapidly by using an efficient hash table implementation of the generalized Hough transform. Each cluster of 3 or more features that agree on an object and its pose is then subject to further detailed model verification and subsequently outliers are discarded. Finally the probability that a particular set of features indicates the presence of an object is computed, given the accuracy of fit and number of probable false matches. Object matches that pass all these tests can be identified as correct with high confidence. Table I summarizes the advantages of using SIFT algorithm in the image analysis.

TABLE I

| Problem | Technique | Advantage |
| --- | --- | --- |
| Key localization/scale/rotation | DoG/scale-space pyramid/orientation assignment | Accuracy, stability, scale & rotational invariance |
| Geometric distortion | Blurring/resampling of local image orientation planes | Affine invariance |
| Indexing and matching | Nearest neighbor/Best Bin First search | Efficiency/speed |
| Cluster identification | Hough Transform voting | Reliable pose models |
| Model verification/outlier detection | Linear least squares | Better error tolerance with fewer matches |
| Hypothesis acceptance | Bayesian Probability analysis | Reliability |

Match moving algorithm is another 3-D reconstruction algorithm. In cinematography, match moving is a cinematic technique that allows the insertion of computer graphics into live-action footage with correct position, scale, orientation, and motion relative to the photographed objects in the shot. The term is used loosely to describe several different methods of extracting camera motion information from a motion picture. Sometimes referred to as motion tracking or camera solving, match moving is related to rotoscoping and photogrammetry. Rotoscoping is an animation technique in which animators trace over footage, frame by frame, for use in live-action and animated films.

Match moving is sometimes confused with motion capture, which records the motion of objects, often human actors, rather than the camera. Typically, motion capture requires special cameras and sensors and a controlled environment. Match moving is also distinct from motion control photography, which uses mechanical hardware to execute multiple identical camera moves. Match moving, by contrast, is typically a software-based technology, applied after the fact to normal footage recorded in uncontrolled environments with an ordinary camera.

Match moving is primarily used to track the movement of a camera through a shot so that an identical virtual camera move can be reproduced in a 3-D animation program. When new animated elements are composited back into the original live-action shot, they will appear in perfectly-matched perspective and therefore appear seamless By using SIFT or match moving algorithm to analyze a set of image data captured by an image-capturing device, it is possible to obtain the estimation of position of an object.

The SIFT or match moving algorithms never actually compute the pose of objects, only the pose of the camera. If the geometry of an object is known, the pose of the camera can be determined relative to that object. In this implementation, only key-points are used in which their positions are estimated.

The Bundle adjustment algorithm is used as the last step of every feature-based 3-D reconstruction algorithm. It amounts to an optimization problem on the 3-D structure and viewing parameters (i.e., camera pose and possibly intrinsic calibration and radial distortion), to obtain a reconstruction which is optimal under certain assumptions regarding the noise pertaining to the observed image features.

If the image error is zero-mean Gaussian, then bundle adjustment is the Maximum Likelihood Estimator. Its name refers to the bundles of light rays originating from each 3-D feature and converging on each camera's optical center, which are adjusted optimally with respect to both the structure and viewing parameters.

In statistics, Maximum-Likelihood estimation (MLE) is a method of estimating the parameters of a statistical model. When applied to a data set and given a statistical model, maximum-likelihood estimation provides estimates for the model's parameters.

In general, for a fixed set of data and underlying statistical model, the method of maximum likelihood selects the set of values of the model parameters that maximizes the likelihood function. Intuitively, this maximizes the "agreement" of the selected model with the observed data, and for discrete random variables it indeed maximizes the probability of the observed data under the resulting distribution. Maximum-likelihood estimation gives a unified approach to estimation, which is well-defined in the case of the normal distribution and many other problems.

Bundle adjustment boils down to minimizing the re-projection error between the image locations of observed and predicted image points, which is expressed as the sum of squares of a large number of nonlinear, real-valued functions.

The re-projection error is a geometric error corresponding to the image distance between a projected point and a measured one. It is used to quantify how closely an estimate of a 3-D point recreates the point's true projection.

Minimizing the re projection error can be used for estimating the error from point correspondences between two images. The correspondences can be interpreted as imperfect images of a world point and the re-projection error quantifies their deviation from the true image projections Thus, the minimization of the re projection error can be achieved by using nonlinear least-squares algorithms. Of these, Levenberg-Marquardt has proven to be one of the most successful due to its ease of implementation and its use of an effective damping strategy that lends it the ability to converge quickly from a wide range of initial guesses.

Various more-or-less heuristic arguments have been put forward for the best choice for the damping parameter $\lambda$. Theoretical arguments exist showing why some of these choices guaranteed local convergence of the algorithm; however these choices can make the global convergence of the algorithm suffer from the undesirable properties of steepest-descent, in particular very slow convergence close to the optimum.

Marquardt recommended starting with a value $\lambda_0$ and a factor $v>1$. Initially setting $\lambda=\lambda_0$ and computing the residual sum of squares after one step from the starting point with the damping factor of $\lambda=\lambda_0$ and secondly with $\lambda_0/v$. If both of these are worse than the initial point then the damping is increased by successive multiplication by $v$ until a better point is found with a new damping factor of $\lambda_0 v^k$ for some k.

If use of the damping factor $\lambda/v$ results in a reduction in squared residual then this is taken as the new value of $\lambda$ (and the new optimum location is taken as that obtained with this damping factor) and the process continues; if using $\lambda/v$ resulted in a worse residual, but using $\lambda$ resulted in a better residual, then $\lambda$ is left unchanged and the new optimum is taken as the value obtained with $\lambda$ as damping factor.

When solving the minimization problems arising in the framework of bundle adjustment, the normal equations have a sparse block structure owing to the lack of interaction among parameters for different 3-D points and cameras. This can be exploited to gain tremendous computational benefits by employing a sparse variant of the Levenberg-Marquardt algorithm which explicitly takes advantage of the normal equations zeros pattern, avoiding storing and operating on zero elements.

Bundle adjustment amounts to jointly refining a set of initial camera and structure parameter estimates for finding the set of parameters that most accurately predict the locations of the observed points in the set of available images.

The full bundle adjustment is the optimal solution and makes use of all images. However, it requires all images to be collected before any processing can be completed and is not a real-time solution.

In the pair-wise or triplet pose change technique, only 2 or 3 images are used to estimate the change in position and orientation over the image set. When summed up over many images, a trajectory can be estimated. For example, see the U.S. Pat. No. 7,336,814 entitled "Method and apparatus for machine-vision". However, the solution provided by this a technology is prone to drift over time due to the loss of connection between even 2 or 3 images over time.

Kalman filter also can be used to estimate the current position and orientation (pose) of an object.

More specifically, the Kalman filter, also known as linear quadratic estimation (LQE), is an algorithm that uses a series of measurements observed over time, containing noise (random variations) and other inaccuracies, and produces estimates of unknown variables that tend to be more precise than those based on a single measurement alone.

The Kalman filter has numerous applications in technology. A common application is for guidance, navigation and control of vehicles, particularly aircraft and spacecraft. Furthermore, the Kalman filter is a widely applied concept in time series analysis used in fields such as signal processing and econometrics.

The Kalman filter algorithm works in a two-step process. In the prediction step, the Kalman filter produces estimates of the current state variables, along with their uncertainties. Once the outcome of the next measurement (necessarily corrupted with some amount of error, including random noise) is observed, these estimates are updated using a weighted average, with more weight being given to estimates with higher certainty. Because of the algorithm's recursive nature, it can run in real time using only the present input measurements and the previously calculated state; no additional past information is required.

From a theoretical standpoint, the main assumption of the Kalman filter is that the underlying system is a linear dynamical system and that all error terms and measurements have a Gaussian distribution (often a multivariate Gaussian distribution).

However, a solution provided by the Kalman drifts over time due to loss of connection between images thus making it difficult to use the Kalman filter for real time applications.

The present technology of the rolling bundle adjustment, as it is explained below, is an improvement over the prior art techniques of bundle adjustment algorithm because it allows to significantly decrease the amount of computation time thus making possible the real time determination of the pose of the image-capturing device.

Indeed, as it is fully explained below, with each new frame, the rolling bundle adjustment algorithm prescribes removing the position and orientation states associated with the oldest frame and adding position and orientation states for the new frame. An initial estimate of the current frames position and orientation can be made by simply using the previous frames position and orientation estimate. The image locations of the key-points from the last frame are then identified in the new frame. These image measurements are then added to the estimation process using the method of sequential least squares which is much more efficient than completely running the bundle adjustment on the last N frames.

In the embodiment of the present technology, as shown in FIG. 1, the general processor 20 of FIG. 1 is configured to execute the algorithm 21 of FIG. 1 further comprising a rolling bundle adjustment algorithm. The rolling bundle adjustment algorithm computes a bundle adjustment using N frames every time a new frame is available. This is the starting point for this new technique, however the rolling bundle adjustment algorithm uses sequential least squares to add the new frame rather than completely redo the bundle adjustment. Please, full discussion below.

The rolling bundle adjustment algorithm of the present technology is basically a cross between a Kalman filter and the rolling bundle adjustment. Although implemented using sequential least squares, the mathematics are identical to a Kalman filter that retains the previous N-1 frame position and orientation states.

Example II

In general for N frames the tracking algorithm has to track at least 5 key-points through all N frames for bundle adjustment algorithm to work. How many minimum key-points the tracking algorithm has to track if only 5 frames were taken? The answer is still 5 key-points. Indeed, assume that for N taken frames; and K key-points are being tracked. This means the number of unknowns is N*6+K*3 (position and orientation per frame plus the positions of the key-points) while the number of measurements is N*K*2 (2 measurements per key point per frame). So if N=5, there are (30+K*3) unknowns and 10*K measurements. Since, more measurements than unknowns are required for a problem to be at least determined (or over-determined, but not under-determined): 10*K>(30+3*K), so K>30/7 or K>=5.

Example III

Figure 2:
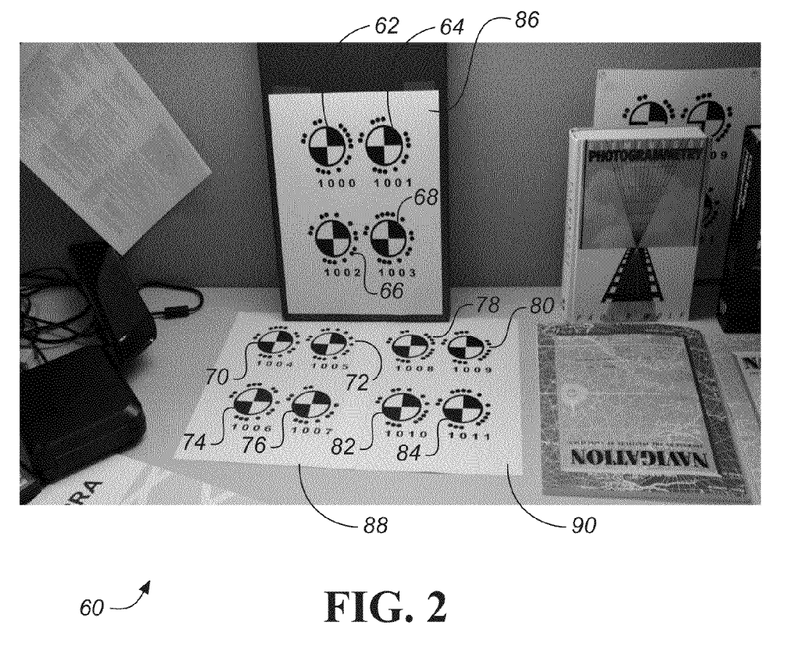
FIG. 2 illustrates a frame from the 720 p video (1280×720) sequence taken at 25 frames per second by Nikon D 800 camera using 35 mm lens for the purposes of the present technology.

FIG. 2 illustrates a frame from the video sequence 60 taken from a Nikon D 800 camera using a 35 mm lens. All images include at least four key-points: image 60 includes the key-points 62 through 88. The camera was set to collect 720 p video (1280×720) at 25 frames per second. Calibration parameters for the camera/lens were pre-computed using the Open CV camera calibration routines. It should be noted that the calibration parameters may also be estimated on the fly as part of the process, however this was not done in this test. The round targets (1000-1011) (or key-points 62, 64, 66 68, 70, 72, 74 76, 78, 80, 82 and 84), were tracked throughout the sequence while the camera was moved (keeping the targets in view at all times to simplify the test). For this example the number of frames used in the rolling bundle adjustment is 25, i.e. 1 second of data.

In order for the rolling bundle adjustment algorithm of the present technology to work, the system should be initialized. For example, the additional navigation device 22 (of FIG. 1) can be used to obtain the initial position coordinates of the image-capturing device 14.

In the embodiment of the present technology, after the initialization is done, but before any estimation can be done, the key-points are identified by using 3 non-collinear targets with known absolute or relative positions. This can be done for the example by automatically identifying the target centers using an existing algorithm within Trimble. The choice of these points can be an important decision. If the initial set of points is able to sufficiently define a datum, the estimated camera positions and orientations can be in this datum and be appropriately scaled.

In the embodiment of the present technology, before any estimation can be done, the key-points are identified by using a key-point detection algorithm such as Sift, Surf, BRISK, etc. Many of these algorithms are already implemented within Open CV.

When natural features are used, an arbitrary coordinate system (not shown) can be defined. If a distance measurement is visible in the images it can be used to correctly scale the solution, otherwise the estimates will also be arbitrarily scaled (i.e. the estimated positions will require a similarity transformation to obtain world coordinates). Alternatively, if the location of the camera can be determined via some other positioning system (say GNSS), these camera location estimates can be used to scale the solution as well as define the required datum.

In the embodiment of the present technology, referring still to FIG. 1, once the key-point 30 has been found in the first image 24, the corresponding key-points should be found in the following frames (not shown). This can be done by using key-point descriptors or tracking algorithms such as the Lucas-Kanade tracking algorithm.

The Lucas-Kanade method is a widely used differential method for optical flow estimation developed by Bruce D. Lucas and Takeo Kanade. It assumes that the flow is essentially constant in the proximity of the pixel under consideration, and solves the basic optical flow equations for all the pixels in that vicinity, by the least squares criterion. By combining information from several nearby pixels, the Lucas-Kanade method can often resolve the inherent ambiguity of the optical flow equation. It is also less sensitive to image noise than point-wise methods. On the other hand, since it is a purely local method, it cannot provide flow information in the interior of uniform regions of the image.

The Kanade-Lucas-Tomasi (KLT) feature tracker is an approach to feature extraction. It is proposed mainly for the purpose of dealing with the problem that traditional image registration techniques are generally costly. KLT makes use of spatial intensity information to direct the search for the position that yields the best match. It is faster than traditional techniques for examining far fewer potential matches between the images.

In an embodiment of the present technology, the rolling sequential bundle adjustment algorithm (21 of FIG. 1) needs at least 5 key-points for each frame when K=1.

Figure 6:
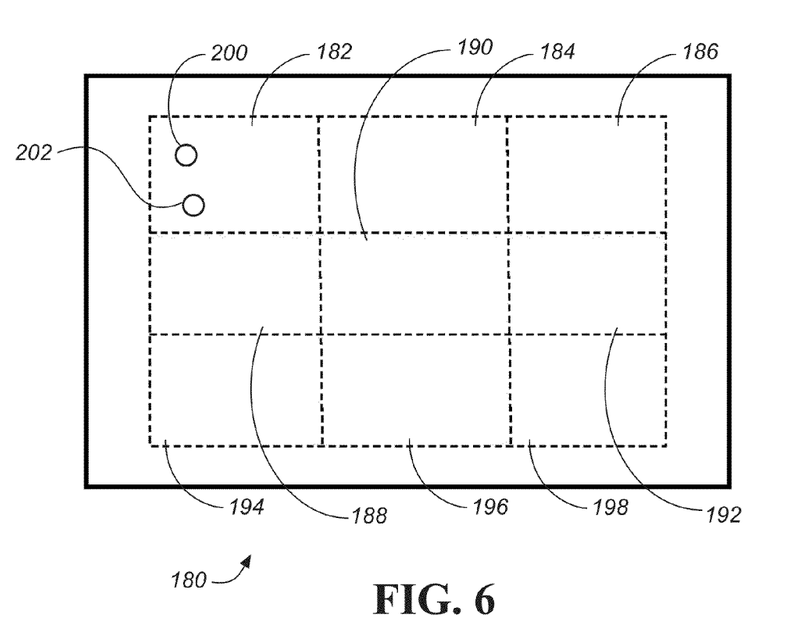
FIG. 6 depicts an image including a number of segments, each segment including a minimum number of tracked features for the purposes of the present technology.

In an embodiment of the present technology, as shown in FIG. 6, to ensure good geometry while also keeping the number of tracked features low is to segment the image 180 into sections (182, 184, 186, 188, 190, 192, 194, 199 and 198)

and attempt to track a minimum two key-points (200 and 202) in each segment in the subsequent frames.

In an embodiment of the present technology, one of the requirements for the imagery is that the corresponding images (in consequent frames) have a significant overlap (say >50%) with one another. The frame rate required to maintain such overlap is dependent on the camera dynamics. Higher dynamics will require a higher frame rate.

In an embodiment of the present technology, an alternative approach to using a constant frame rate is to collect images whenever the camera moves a given distance or changes orientation by a maximum rotation. This approach requires a secondary source of position, velocity, and/or orientation to control the camera shutter.

In an embodiment of the present technology, referring still to FIG. 1, the collected image data is next fed into a least squares bundle adjustment algorithm 21 which estimates the position and orientation of the image-capturing device 14 for each frame (6'-vector 40 including the position coordinates (x, y, z) as well as the orientation angles θ, φ, and ψ) as well as the 3-D coordinates of the tracked key-points: position coordinates 42 data $(x_{i1}, y_{i1}, z_{i1})$ for the key-point $1_1$, the position coordinates 44 data $(x_{i2}, y_{i2}, z_{i2})$ for the key-point $i_2$, and the position coordinates 46 data $(s_{ick}, y_{iK}, z_{iK})$ for the key-point $i_K$.

The fundamental equations that are solved in the estimation are known as the collinearity equations. The collinearity equations are a set of two equations, used in photogrammetry and remote sensing to relate coordinates in a sensor plane (in two dimensions) to object coordinates (in three dimensions). The equations originate from the central projection of a point of the object through the optical center of the camera to the image on the sensor plane.

Figure 4:
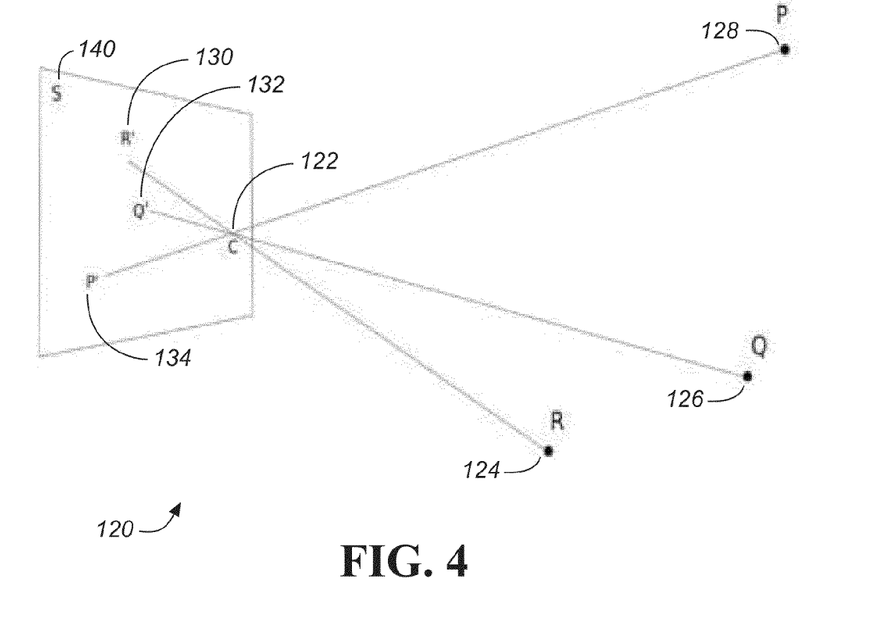
FIG. 4 shows 2-D projections of 3-D points on a plane by using a pinhole camera for the purposes of the present technology.
Figure 5:
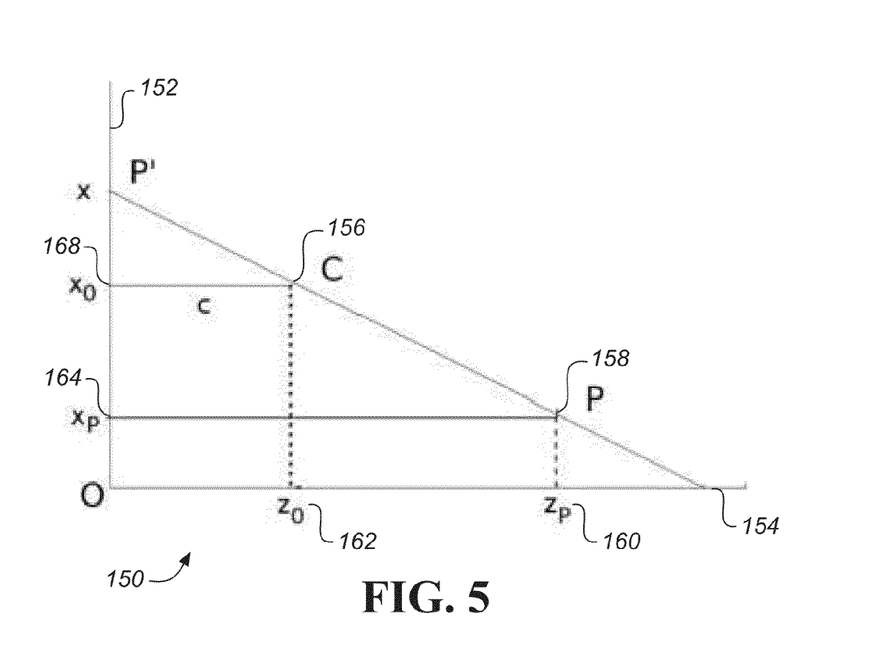
FIG. 5 illustrates x- and z-coordinates of the 2-D projection of a 3-D point through a projection center of a pinhole camera for the purposes of the present technology.

FIGS. 3, 4, and 5 illustrate the geometry that is utilized in collinearity equations.

More specifically, FIG. 3 depicts light beams 104 and 106 passing through the pinhole 102 of a pinhole camera 108.

FIG. 4 shows 2-D projection 134 of 3-D point 128 (2-D projection 130 of 3-D point 124, and 2-D projection 132 of 3-D point 126) on a plane 140 by using a pinhole camera with the center 122.

FIG. 5 illustrates x (168) and z (162) coordinates of 2-D projection C 156 of 3-D point through a projection center 102 of the pinhole camera 108 of FIG. 3, as well as x (164) and z (160) coordinates of 2-D projection P 158 of 3-D point through the projection center 102 of the pinhole camera 108 of FIG. 3.

Derivation and details of the collinearity equations can be found in any textbook on photogrammetry. One possible derivation (please, see for the reference "Elements of Photogrammetry" by Paul R. Wolf, published by McGraw-Hill, 2000) results in the following:

where $x_a$ is the measured x image coordinate of point a;
$y_a$ is the measured y image coordinate of point a;
$X_a, Y_a, Z_a$ are the world coordinates of point a;
$X_l, Y_l, Z_l$ are the world coordinates of camera 1;
ω, φ, κ are the Euler angle rotations of camera 1;
c is the principal distance (approximately the focal length of the camera);
m is the rotation matrix from the camera coordinate system to the world coordinate system.

Figure 7:
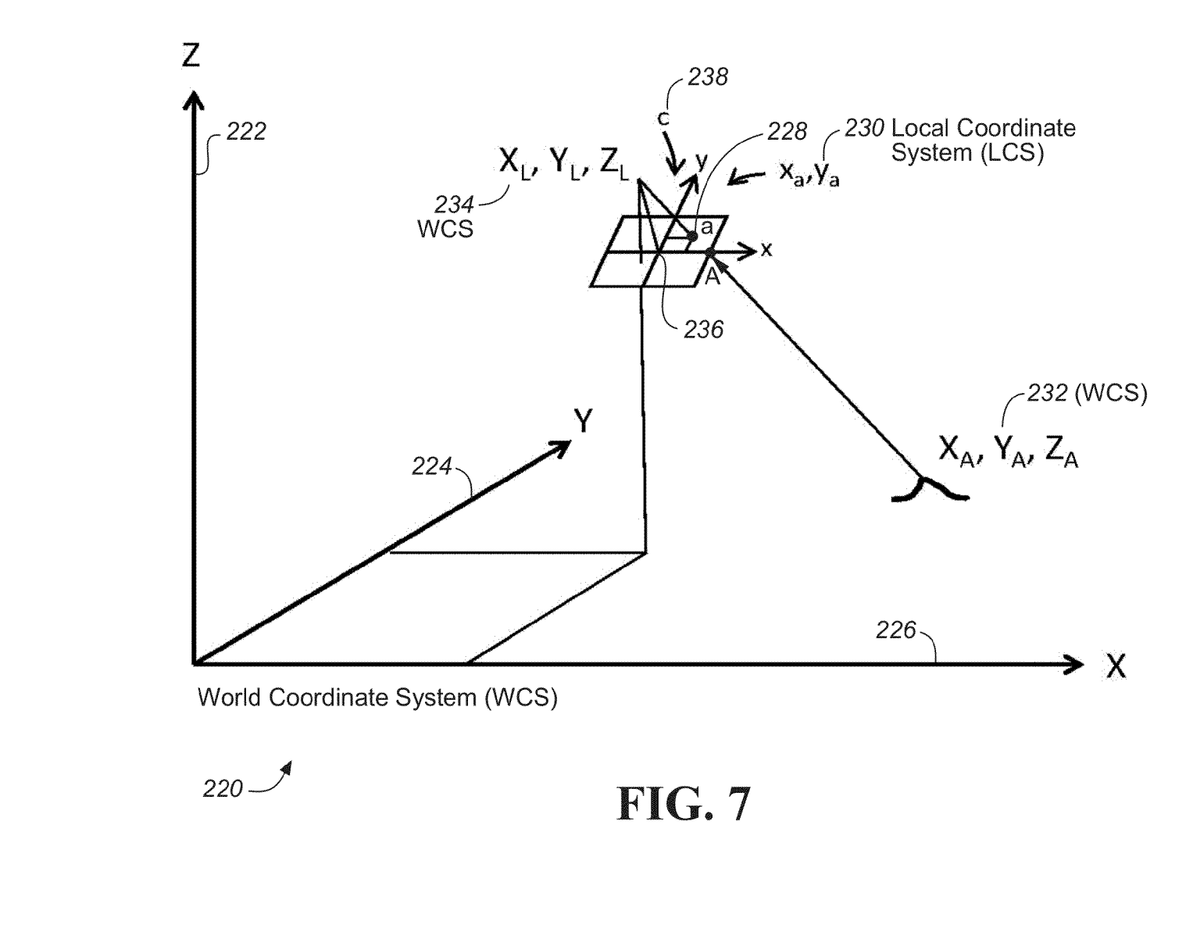
FIG. 7 illustrates the solution of collinearity equations utilized for estimation of camera position and orientation for each frame and for estimating 3-D coordinates of the tracked key-points system for the purposes of the present technology.

In an embodiment of the present technology, FIG. 7 illustrates the geometry involved in formulation of collinearity equations (Eq. 1 and Eq. 2) with the matrix m given by (Eq. 3 and Eq. 4) that are utilized for estimation of camera position and orientation for each frame and for estimating 3-D coordinates of the tracked key-points.

Referring still to FIG. 7, 3-D coordinates $(X_A, Y_A, Z_A)$ of 3-D point A in World Coordinate System (WCS) (X 226, Y 224, Z 222) are indicated by point 232, whereas 3-D coordinates $(X_L, Y_L, Z_L)$ of 3-D point of the camera center L in World Coordinate System (WCS) are indicated by point 236.

Referring still to FIG. 7, 2-D coordinates $(x_a, y_a)$ of the point a in 2-D camera Local Coordinate System (LCS) (camera frame plane) are shown by point 230.

Example IV

Referring still to FIG. 2, suppose that the 12 targets (62, 64, 66, 68, 70, 72, 74, 76, 78, 80, 82, and 84) are tracked and their coordinates are known. Each image results in 2 measurements (x and y) per target per frame resulting in 2*12*25=1200 measurements for 25 frames. The unknowns in this example would be the position and orientation of the image-capturing device (14 of FIG. 1) (including camera Nikon D 800 camera using a 35 mm lens) per frame, i.e. 6*25=150 unknowns. Clearly the minimum number of image measurements should be 150/25/2=3. In the case where an additional 3 natural features are tracked, there would be an additional 3*2*25=150 measurements as well as an additional 3*3=9 unknowns (XYZ for each of the three points). Additional measurements to known or unknown points can add significant geometric strength to the estimation resulting in estimates with less noise.

In an embodiment of the present technology, the collinearity equations (Eq. 1 and Eq. 2) with the matrix m given by (Eq. 3 and Eq. 4) are re-formulated in terms of least squares adjustment for the purposes of optimal estimation.

More specifically, in an embodiment of the present technology, the basic least squares equations for the above problem are summarized as follows:

$$x_a = -c\left[\frac{m_{11}(X_a - X_l) + m_{12}(Y_a - Y_l) + m_{13}(Z_a - Z_l)}{m_{31}(X_a - X_l) + m_{32}(Y_a - Y_l) + m_{33}(Z_a - Z_l)}\right] \quad \text{(Eq. 1)}$$

$$y_a = -c\left[\frac{m_{21}(X_a - X_l) + m_{22}(Y_a - Y_l) + m_{23}(Z_a - Z_l)}{m_{31}(X_a - X_l) + m_{32}(Y_a - Y_l) + m_{33}(Z_a - Z_l)}\right] \quad \text{(Eq. 2)}$$

$$m = \begin{bmatrix} m_{11} & m_{12} & m_{13} \\ m_{21} & m_{22} & m_{23} \\ m_{31} & m_{32} & m_{33} \end{bmatrix} \quad \text{(Eq. 3)}$$

$$m = \begin{bmatrix} \cos\phi\cos\kappa & \sin\omega\sin\phi\cos\kappa + \cos\omega\sin\kappa & -\cos\omega\sin\phi\cos\kappa + \sin\omega\sin\kappa \\ -\cos\phi\sin\kappa & -\sin\omega\sin\phi\sin\kappa + \cos\omega\cos\kappa & \cos\omega\sin\phi\sin\kappa + \sin\omega\cos\kappa \\ \sin\phi & -\sin\omega\cos\phi & \cos\omega\cos\phi \end{bmatrix} \quad \text{(Eq. 4)}$$

$$\hat{l}=f(\hat{x}) \quad \text{(Eq. 5)}$$

$$\hat{r}=A\hat{\delta}+w \quad \text{(Eq. 6)}$$

$$w=f(x^o)-l \quad \text{(Eq. 7)}$$

$$\hat{\delta}=-N^{-1}u=-(A^TC_l^{-1}A)^{-1}A^TC_l^{-1}w \quad \text{(Eq. 8)}$$

$$C_{\hat{x}}=N^{-1} \quad \text{(Eq. 9)}$$

Where
- $\hat{l}$ is a vector of adjusted observations;
- $f(\hat{x})$ is the collinearity equations evaluated at $\hat{x}$;
- $x^o$ is the current estimate of the state x;
- $\hat{r}$ is a vector of residuals;
- A is a Jacobean matrix (partial derivatives of the collinearity equations w.r.t. the unknowns);
- $\hat{\delta}$ is a vector of corrections to the unknown parameters;
- w is a vector of misclosures;
- $C_l$ is the covariance matrix for the measurements;
- $C_{\hat{x}}$ is the covariance matrix for the estimated parameters.

One of the most time consuming operations in the estimation is the inversion of the matrix (N) with the number of rows and columns equal to the number of unknown states. Given the iterative nature of least squares, this matrix may require inversion once per iteration.

In an embodiment of the present technology, as was disclosed above, once the initialization has been completed, the camera positions and orientations for the first N frames have been estimated along with the positions of the selected key-points. The next step is to continue estimating the camera states the as new subsequent frames (N+1, N+2, etc.) become available.

Figure 8:
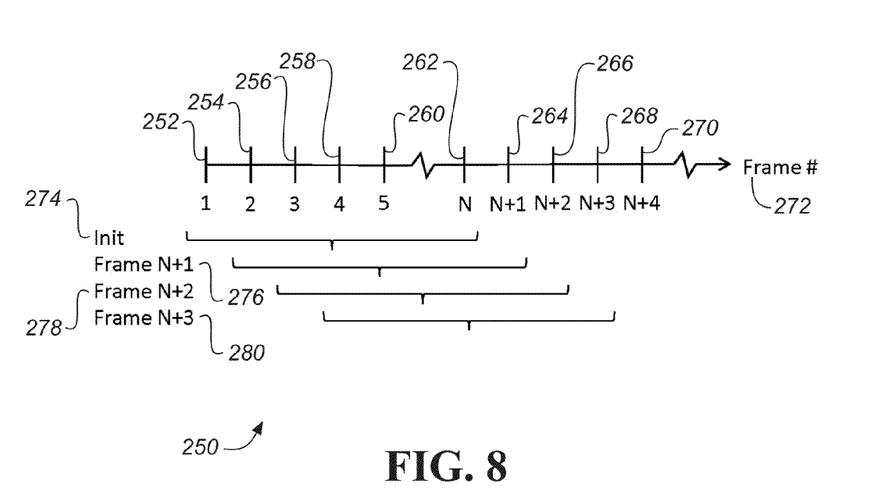
FIG. 8 shows the sequential update in estimation of camera positions and orientation from the initial N frames to the subsequent (N+1) frames while using the rolling sequential bundle adjustment algorithm for the purposes of the present technology.

In an embodiment of the present technology, FIG. 8 shows the rolling adjustment sequential update algorithm 250 in estimation of camera positions and orientation from the initial N frames to the subsequent (N+1) frames.

More specifically, the bundle adjustment algorithm solution based on the initial N frames (from 252 and up to 262) is schematically noted as the initial solution 274, whereas the bundle adjustment algorithm solution based on (N+1) frames (from 252 and up to 264) is schematically noted as the subsequent solution 276.

When a new frame becomes available, the oldest frame is removed from the state estimation. The rows and columns associated with the frame to be removed are replaced with initial estimates for the newest frame. This initial estimate of the camera position and orientation at the new frame may be computed from the estimated key-points or if the frame rate is high relative to the camera dynamics the estimate can simply be set to the same values as the previous frame.

In an embodiment of the present technology, the rolling sequential update is accomplished in a sequential manner using the following equations:

$$\hat{\delta}^{(+)}=\hat{\delta}^{(-)}-K[w_2+A_2\hat{\delta}^{(-)}] \quad \text{(Eq. 10)}$$

$$C_{\hat{x}}^{(+)}=N_1^{-1}-KA_2N_1^{-1} \quad \text{(Eq. 11)}$$

$$K=N_1^{-1}A_2^T[C_l+A_2N_1^{-1}A_2^T]^{-1} \quad \text{(Eq. 12)}$$

Where (+), (−) indicate parameters before and after the measurement update.

The major advantage of this technique is that the only new inversion required for the sequential update is the matrix contained within the gain term K. The matrix to be inverted is a square matrix with the dimensions equal to the number of new measurements associated with the new image.

Example V

For the Examples III and IV outlined above in which 12 key-points are tracked, the required inversion would be on a 24×24 matrix. This is compared to re-computing the bundle adjustment with all N frames which would require an inversion of a matrix with dimensions of 25*6×25*6=150×150.

One of the practical justifications of the present algorithm of rolling sequential bundle adjustment that utilizes images to track position and orientation changes is that some key-points will no longer be visible as the camera moves. This requires that the no longer visible key-points be removed from the estimation as they no longer provide useful information. This removal is accomplished by simply removing the associated rows and columns in the state and covariance matrices. Also, as the camera moves it will become necessary to identify and track new key-points and add them into the estimation. Once a new key-point is identified, it should be tracked over multiple images in order to compute initial coordinates which can then be used to insert the associated position into the state and covariance matrices.

Figure 9:
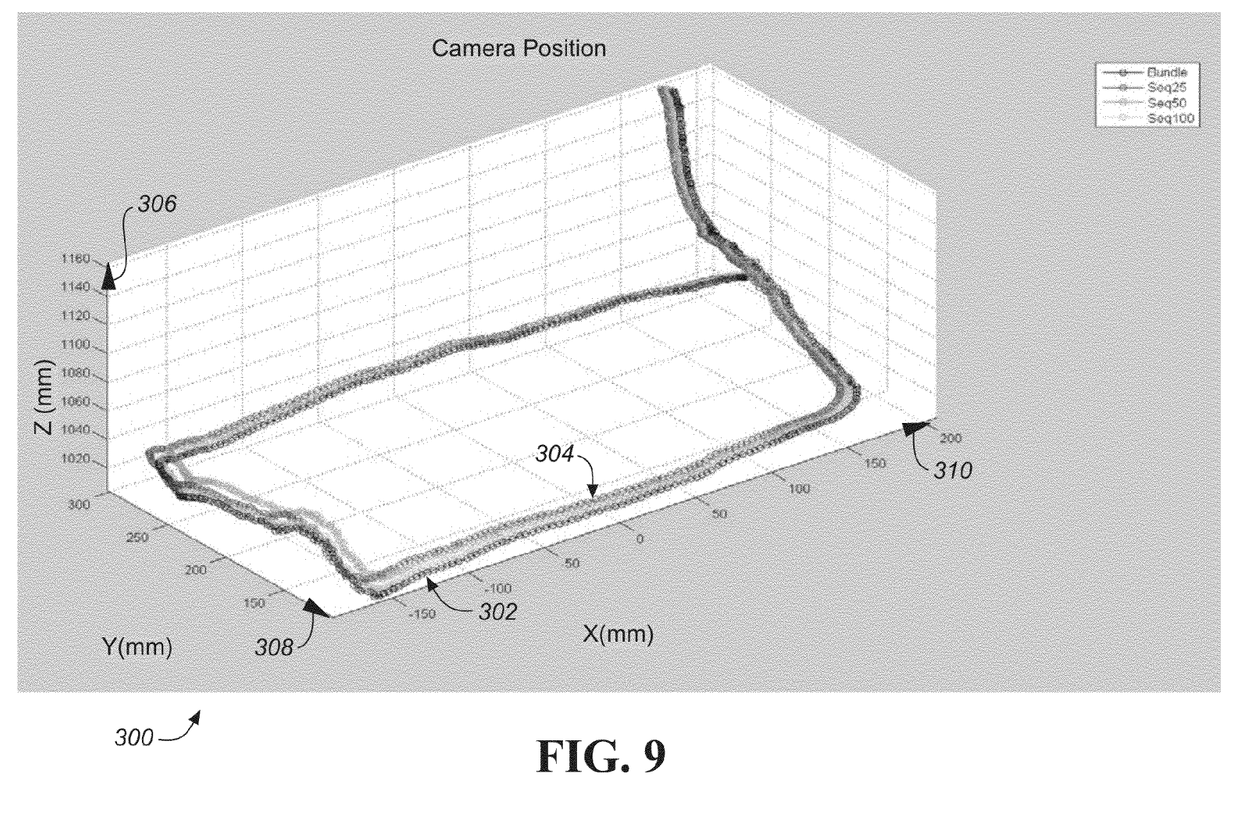
FIG. 9 depicts the comparison of the output camera trajectories obtained by employing the rolling sequential bundle adjustment algorithm of the present technology and obtained by employing the prior art bundle adjustment algorithm for values of number of frames used: N=25, 50, and 100.

FIG. 9 depicts in the Global Coordinate System X (310), Y (308) and Z (306) the comparison 300 of the output camera trajectories (302 and 304) obtained by employing the rolling sequential bundle adjustment algorithm of the present technology and obtained by employing the prior art bundle adjustment algorithm for values of number of frames used: N=25, 50, and 100.

The results illustrated in FIG. 9 demonstrate the proof of concept that the results obtained by employing the rolling sequential bundle adjustment algorithm of the present technology and obtained by employing the prior art bundle adjustment algorithm are very close, but the method of the present technology of employing the rolling sequential bundle adjustment algorithm required exponential less computing time.

Figure 10:
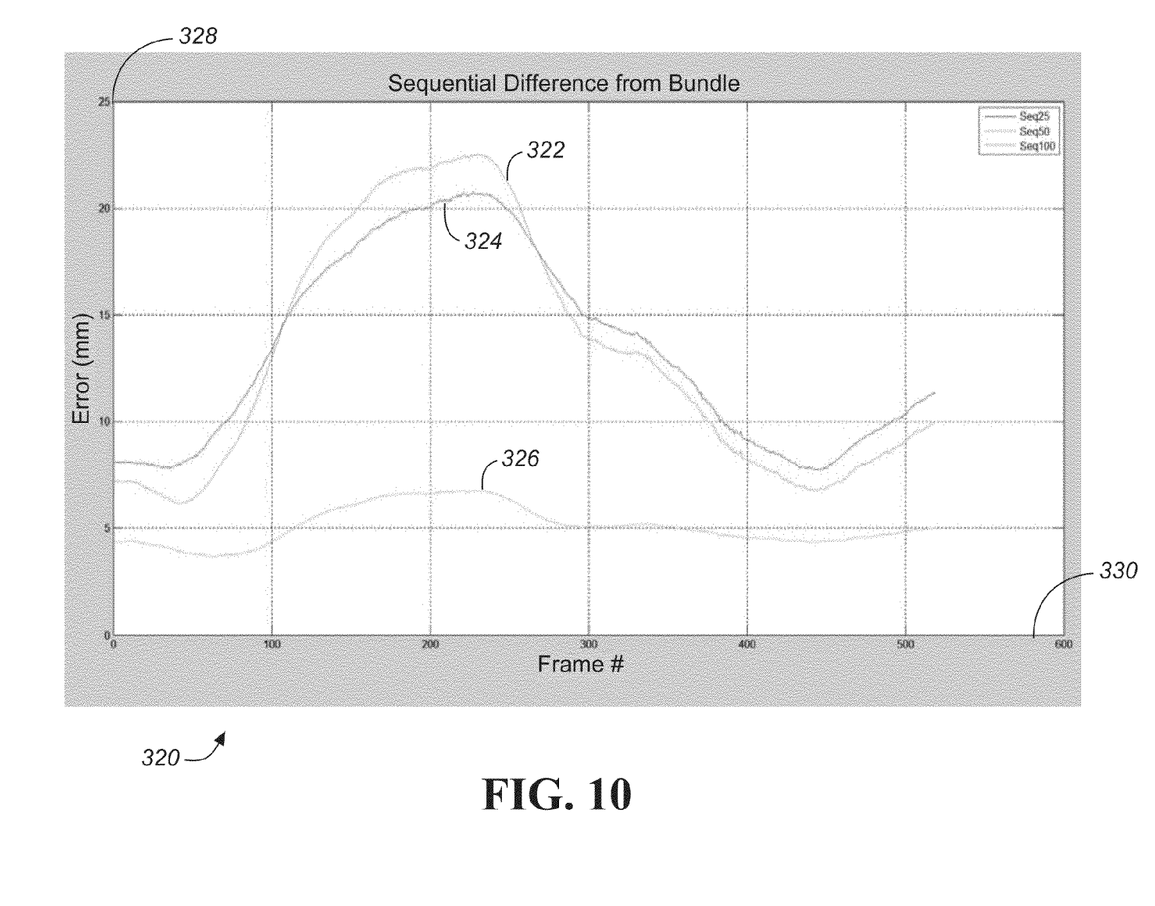
FIG. 10 illustrates the comparison of positions of the camera obtained by employing the rolling sequential bundle adjustment algorithm of the present technology and obtained by employing the prior art bundle adjustment algorithm for values of number of frames used: N=25, 50, and 100.

FIG. 10 illustrates the comparison 320 of positions of the camera obtained by employing the rolling sequential bundle adjustment algorithm of the present technology and obtained by employing the prior art bundle adjustment algorithm for values of number of frames used: N=25 (the error curve 324), 50 (the error curve 322), and 100 (the error curve 326). The error curves are becoming negligible (max less than 7 mm) as the number of frames used is going up.

As N gets larger, the differences between the optimal solution and the sequential solution begin to approach one another, and however the cost is a slight increase in computational requirements. For this example even when N=25 the maximum difference is about 21 mm. Also, the time required to update a frame was approximately 25 msec on a laptop with an Intel i7 processor and no optimization of the software.

The results illustrated in FIG. 10 again demonstrate the proof of concept that the results obtained by employing the rolling sequential bundle adjustment algorithm of the present technology and obtained by employing the prior art bundle adjustment algorithm are very close, but the method of the present technology of employing the rolling sequential bundle adjustment algorithm required exponential less computing time.

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method of estimating position and orientation of an image-capturing device comprising:
   (A) obtaining a set of images by using said image-capturing device by processing a preceding set of frames; each said frame including a set of image data;
   (B) estimating previous position and orientation states of said image-capturing device by using state and covariance matrices including a set of image data included in at least one said preceding frame; and
   (C) estimating current position and orientation states of said image-capturing device by performing a sequential update of said state and covariance matrices; wherein for each new frame, said sequential update of said state and covariance matrices is performed by removing position and orientation states associated with an oldest preceding frame and by adding position and orientation states for said new frame.

2. The method of claim 1, wherein said step (A) further comprises:
   (A1) selecting said image capturing device from the group consisting of: a digital camera; a digital video camera; a digital camcorder; a stereo digital camera; a stereo video camera; a motion picture camera; and a television camera.

3. The method of claim 1, wherein said step (A) further comprises:
   (A2) calibrating said image-capturing device to correct the images for lens distortions; said lens distortions selected from the group consisting of:
   a principal distance distortion; a focal length; a principal point offset; a radial distortion; and a tangential distortion.

4. The method of claim 1, wherein said step (B) further comprises:
   (B1) making an initial estimate of said position and orientation states associated with said current new frame by using an estimate of position and orientation states associated with a previous frame.

5. The method of claim 4, wherein said step (B1) further comprises:
   (B1, 1) identifying key-points by using 3 non-collinear targets with known absolute or relative positions.

6. The method of claim 4, wherein said step (B1) further comprises:
   (B1, 2) identifying a set of at least five key-points associated with said at least one preceding frame; identifying said set of at least five key-points associated with at least one said subsequent frame; and based on said set of at least five key-points being identified in said at least one preceding frame and in said at least one subsequent frame substantially accurately determining a relative change between said at least one preceding frame and said at least one subsequent frame.

7. The method of claim 1, wherein said step (B) further comprises:
   (B2) for each new frame, estimating initial position and orientation states of said image-capturing device by using an additional navigation device.

8. The method of claim 7, wherein said step (B2) further comprises:
   (B2, 1) selecting said additional navigation device from the group consisting of:
   a smart phone; a tablet; a laptop; and a personal navigation device.

9. The method of claim 1, wherein said step (C) further comprises:
   (C1) for each new frame, sequentially updating said state and covariance matrices by replacing a set of image data related to at least five key-points included in said preceding frame by a set of image data related to at least five same key-points included in said subsequent frame.

10. The method of claim 1, wherein said step (C) further comprises:
    (C2) for each new frame, sequentially updating said state and covariance matrices; wherein the only new inversion required for said sequential update is an inversion of a square matrix with the dimensions equal to the number of new measurements associated with said new frame.

11. The method of claim 1, wherein said step (C) further comprises:
    (C3) estimating current position and orientation states of said image-capturing device by using the method of Kalman filtering.

12. The method of claim 1 further comprising:
    (D) selecting a relevant coordinate system.

13. The method of claim 12, wherein said step (D) further comprises:
    (D1) selecting said relevant coordinate system from the group consisting of: a Global Coordinate System; and a Local Coordinate System.

14. An apparatus for estimation of position and orientation states of an image-capturing device comprising:
(A) a means for obtaining a set of images by processing a preceding set of frames; each said frame including a set of image data;
(B) a means for estimating previous position and orientation states of said image-capturing device by using state and covariance matrices including a set of image data included in at least one said preceding frame; and
(C) a means for estimating current position and orientation states of said image-capturing device by performing a sequential update of said state and covariance matrices; wherein for each new frame, said sequential update of said state and covariance matrices is performed by removing position and orientation states associated with an oldest preceding frame and by adding position and orientation states for said new frame.

15. The apparatus of claim 14, wherein said means (A) further comprises:
(A1) said image capturing device selected from the group consisting of: a digital camera; a digital video camera; a digital camcorder; a stereo digital camera; a stereo video camera; a motion picture camera; and a television camera.

16. The apparatus of claim 14, wherein said means (B) further comprises:
(B1) an algorithm including at least the step of making an initial estimate of said position and orientation states associated with said current new frame by using an estimate of position and orientation states associated with a previous frame.

17. The apparatus of claim 14, wherein said means (B) further comprises:
(B2) an algorithm including at least the step of identifying key-points by using 3 non-collinear targets with known absolute or relative positions.

18. The apparatus of claim 14, wherein said means (B) further comprises:
(B2) an algorithm including at least the step of identifying a set of at least five key-points associated with said at least one preceding frame; identifying said set of at least five key-points associated with at least one said subsequent frame; and based on said set of at least five key-points being identified in said at least one preceding frame and in said at least one subsequent frame substantially accurately determining a relative change between said at least one preceding frame and said at least one subsequent frame.

19. The apparatus of claim 14, wherein said means (B) further comprises:
(B3) an additional navigation device configured for each new frame to estimate initial position and orientation states of said image-capturing device.

20. The apparatus of claim 19, wherein said additional navigation device is selected from the group consisting of:
a smart phone; a tablet; a laptop; and a personal navigation device.

21. The apparatus of claim 14, wherein said means (C) further comprises:
(C1) an algorithm, for each new frame including at least the step of sequentially updating said state and covariance matrices by replacing a set of image data related to at least five key-points included in said preceding frame by a set of image data related to at least five same key-points included in said subsequent frame.

22. The apparatus of claim 14, wherein said means (C) further comprises:
(C2) an algorithm, for each new frame including at least the step of sequentially updating said state and covariance matrices; wherein the only new inversion required for said sequential update is an inversion of a square matrix with the dimensions equal to the number of new measurements associated with said new frame.

23. The apparatus of claim 14, wherein said means (C) further comprises:
(C2) Kalman filtering algorithm.

24. An article comprising a non-transient storage medium having stored thereon instructions that, when executed, result in a computing platform having the capability to perform an estimation of position and orientation of an image-capturing device by executing an algorithm further comprising:
(A) obtaining a set of images by using said image-capturing device by processing a preceding set of frames; each said frame including a set of image data;
(B) estimating previous position and orientation states of said image-capturing device by using state and covariance matrices including a set of image data included in at least one said preceding frame; and
(C) estimating current position and orientation states of said image-capturing device by performing a sequential update of said state and covariance matrices; wherein for each new frame, said sequential update of said state and covariance matrices is performed by removing position and orientation states associated with an oldest preceding frame and by adding position and orientation states for said new frame.

* * * * *